United States Patent [19]

Milazzo

[11] Patent Number: 5,141,119
[45] Date of Patent: Aug. 25, 1992

[54] METHOD FOR LIMITING MOVEMENT OF A BOOM

[76] Inventor: James D. Milazzo, 13046 Gurney La., Baton Rouge, La. 70818

[21] Appl. No.: 688,983

[22] Filed: Apr. 22, 1991

[51] Int. Cl.⁵ ............................................. B60R 25/02
[52] U.S. Cl. ..................................... 212/165; 70/212
[58] Field of Search ................ 212/159, 160, 162–165; 200/43.01, 43.11, 43.15, 43.16, 43.19, 43.21; 91/41; 70/210, 211, 212, 244, 247

[56] References Cited

U.S. PATENT DOCUMENTS

| | | | |
|---|---|---|---|
| 2,529,193 | 11/1950 | Rueter | 212/39 |
| 3,092,261 | 6/1963 | Nesbit | 212/59 |
| 3,426,164 | 2/1969 | Dessert | 200/43.15 |
| 3,561,610 | 2/1971 | Buckert | 212/39 |
| 3,599,801 | 8/1971 | Roll | 212/162 |
| 3,601,169 | 8/1971 | Hamilton | 212/162 |
| 3,678,228 | 7/1972 | Adamson | 200/43.15 |
| 3,961,685 | 6/1976 | Kozai | 182/19 |
| 4,043,253 | 8/1977 | Albright | 92/25 |
| 4,566,599 | 1/1986 | Villa et al. | 212/168 |
| 4,677,261 | 6/1987 | Nourry | 200/43.15 |
| 4,733,029 | 3/1988 | Kobayashi et al. | 200/43.15 |
| 4,759,424 | 7/1988 | Rolleri | 70/247 |
| 4,825,670 | 5/1989 | Snow | 70/247 |
| 4,888,968 | 12/1989 | Azvedo | 70/212 |
| 5,042,754 | 8/1991 | Heath | 70/211 |

FOREIGN PATENT DOCUMENTS

| | | | |
|---|---|---|---|
| 527448 | 10/1956 | Belgium | 200/43.16 |
| 1061494 | 7/1959 | Fed. Rep. of Germany | 212/165 |
| 1157754 | 11/1963 | Fed. Rep. of Germany | 212/165 |
| 909717 | 5/1946 | France | 70/212 |
| 89931 | 8/1954 | Norway | 212/165 |
| 1064665 | 4/1967 | United Kingdom | 212/162 |
| 1202530 | 8/1970 | United Kingdom | 212/164 |
| 2214885 | 9/1989 | United Kingdom | 70/247 |

*Primary Examiner*—Jesus D. Sotelo
*Assistant Examiner*—Stephen P. Avila
*Attorney, Agent, or Firm*—David L. Ray

[57] ABSTRACT

The method of the invention includes moving a control stick to fix the boom in the desired position, and then locking the stick in the desired position so that the operator cannot move the stick. The apparatus of the invention includes a bracket connected to the cab of the crane for receipt of a control stick, and a lock for connecting the control stick to the bracket.

2 Claims, 3 Drawing Sheets

METHOD FOR LIMITING MOVEMENT OF A BOOM

BACKGROUND OF THE INVENTION

1. Field of the Invention

The present invention is related to safety devices for crane booms. More particularly, the present invention is related to methods and apparatus for limiting the movement of a crane boom. Even more particularly, the present invention is related to a method and apparatus for locking a crane boom control stick in a stationary position.

2. Description of the Prior Art

Cranes are well known in the art as devices for hoisting and moving objects utilizing a movable boom. Many modern cranes use booms operated hydraulically rather than by steel cables. Some modern hydraulic cranes have telescoping booms, while other cranes employ articulated booms. Most cranes are mobile, although some are connected to a stationary base. Most cranes can turn in a complete circle on their base, and the boom can be moved upward and downward, and the end of the boom can be moved toward and away from the base of the crane.

The movement of a crane boom is commonly controlled by a plurality of control sticks. The control sticks are usually mounted on the floor of a cab on the crane in which the operator sits. Usually a single control stick controls the movement of the boom upward and downward, and another stick controls the movement of the end of the boom toward and away from the crane. The control sticks are commonly designed to be grasped by the operator and moved away from the operator and toward the operator in a plane to control movement of the crane boom.

The control sticks on hydraulically-operated cranes are essentially "on-off" switches. Thus, when the control stick is moved away from or toward the operator from the neutral position, the crane member controlled by the control stick will move until the control stick is returned to the neutral position, at which time the crane member will remain in the position to which it has been moved.

It is frequently desirable to limit the movement of crane booms in one or more dimensions. For example, if the mobile crane is working under an electric utility line commonly referred to as a power line, it is desirable to limit the upward movement of a mobile crane boom to a height less than the height of the electric utility line to prevent contact of the boom with the electric utility line. Contact of the boom with the electric utility line can result in death or serious injury to the crane operator and/or destruction of the crane and utility line.

Furthermore, a crane may be located close to a vertical wall or a building or other structure making it desirable to limit the distance the boom may be extended from the base upon which the boom rests. If the boom were accidently extended too far from the base the boom could strike the wall possibly causing damage to the wall, crane, and personnel.

Also, it may be desirable to prevent the crane from turning on its base if the crane is working between two vertical structures. For example, the crane may be working between two parallel walls which the crane boom must avoid.

Mechanisms and assemblies for limiting the movement of cranes and other similar objects are known in the art. Exemplary of the prior art are the following U.S. patents:

U.S. Pat. No. 4,043,253 discloses a boom cylinder stop for the lift cylinders of a skid steer vehicle having an elongated tubular body portion which is mounted on the rod end of one of the hydraulic lift cylinders of a skid steer loader. When the boom of the skid steer loader is lifted, the boom stop is carried outwardly with the rod end of the cylinder, the opposite end of the boom stop dropping into a plane adjacent the rod end of the cylinder when the hydraulic cylinder is almost fully extended. Thus the boom stop is interposed between the outer end of the cylinder body and the rod end of the cylinder to retain such lift cylinder in an extended position under loading conditions. A projection provided at a lower end of the boom stop carries a toggle mechanism mounted on a pivotal connection, the mechanism including a ramp like projection which rotates downward when the cylinder is extended further outwardly to disengage the stop from the cylinder body, the ramp engaging both the cylinder body and the body portion of the stop to slide the body portion of the stop onto the cylinder body when the cylinder is pulled back to a fully retracted position.

U.S. Pat. No. 3,961,685 discloses a ladder working limit based ladder stopping device for a vehicle equipped with a vertically and horizontally swingable and extensible ladder (or a fire engine truck), wherein a working limit of the ladder is preset on the basis of an extended length of the ladder corresponding to a particular vertical angle assumed by the ladder, so that when the combined situation of the vertical angle and extended length of the ladder reaches the preset condition, the operating mechanism for the ladder is automatically returned to its neutral position while actuating a warning device and turning on a marker lamp, the operating mechanism being then operated toward the safety side, whereupon the marker lamp is turned off to indicate that the ladder is now safe.

U.S. Pat. No. 3,561,610 discloses an improved safety device on a crane for preventing the crane boom from falling backward onto the crane cab. A push rod is positioned for engagement with the boom when the boom reaches a substantially vertical elevation. The movement of the rod caused by the upwardly moving boom is multiplied through a system of sticks and imparted to a contact stick which pushes the boom control stick into a neutral position thereby stopping the boom before it moves past the maximum safe elevation.

U.S. Pat. No. 3,092,216 discloses a crane boom retarding and stopping device including a cab and a boom pivotally mounted to the cab, a rail assembly, the rail assembly including a pair of opposed side walls, and base connecting the pair of side walls and a device for connecting the rail assembly to the boom, a carriage slidably mounted along the length of the boom and the rail assembly, a guide device within the rail assembly adapted to guide the carriage along the length of the rail assembly, brake shoes mounted and in opposite relation to one another and adapted to engage the opposed wall members of the rail assembly, a hydraulic pressure device mounted on the carriage and adapted to force the brakes into engagement with the wall members of the rail assembly, a shock rod member, the carriage having a pivotal mounting along its upper surface and adapted to pivotally receive one end of the shock rod member, a triangular gantry member fixedly mounted to the cab of the crane and having a transverse support bar with a mounting device located centrally of the support bar, the mounting device being adapted to engage the other end of the shock rod whereby the shock rod may pivot about the axis of transverse member of the gantry frame, a hoist device for raising and lowering the boom along a vertical plane, hydraulic actuating device responsive to the hoist device whereby when the boom is being maintained stationary at a selected vertical position the hydraulic actuating device will act to apply pressure to the hydraulic pressure device for engagement of the brake shoes to the rail assembly of the boom for supporting the boom at the selected vertical position, the hydraulic actuating device being adapted to respond to the hoist device whereby when the hoist device is engaged for moving the boom upwardly or downward the brake shoe engagement is disengaged by the release of the hydraulic pressure, a spring cushion device mounted at the upper end of the rail assembly to provide a remote cushion stop for the carriage movement.

U.S. Pat. No. 2,529,193 discloses a safety boom stop. In a load-handling machine having a hoist boom and power device for operating the boom including a control circuit device and a boom-hoist control member movable into and out of boom-hoisting position, a limit switch connected to the circuit device and having a power-enabling position and a power-disabling position, the limit switch being normally power-enabling position, a mechanical device controlled by the boom for operating the limit switch to power-disabling position upon the raising of the boom to a predetermined height and for restoring the limit switch to power-enabling position upon the lowering of the boom from its limit position, a manually operable locking-type reset switch connected with the circuit device and having an inactive position and a power-enabling position, and reset switch being normally in inactive position and being manually operated to power-enabling position when the limit switch is in power-disabling position, a mechanical device controlled by the boom for restoring the manually operable reset switch from its power-enabling position to its inactive position upon the lowering of the boom from its limit position, and a third switch connected in circuit with the manually operable reset switch and having a mechanical actuating connection with the boom-hoist control member for rendering the reset switch ineffective to energize the power device while the control member is in boom-hoisting position.

SUMMARY OF THE INVENTION

In accordance with the present invention there is provided a method and apparatus for limiting the movement of a crane boom. The present invention includes methods and apparatus for locking a crane boom control stick in a stationary position to prevent movement of a crane boom.

The method of the invention includes moving a control stick to fix the boom in the desired position, and then locking the stick in the desired position so that the operator cannot move the stick. The apparatus of the invention includes a bracket connected to the cab of the crane for receipt of a control stick, and a lock for connecting the control stick to the bracket.

The present invention has the advantage of preventing injury to the operator and other personnel in the vicinity of a crane. Furthermore, the invention can prevent damage to the crane and structures which the crane might strike if the invention is not utilized.

The present invention has the additional advantage of being low in cost to manufacture and being easy to install.

BRIEF DESCRIPTION OF THE DRAWINGS

FIG. 1a is a schematic view of the cab and boom of the invention;

DESCRIPTION OF THE PREFERRED EMBODIMENTS

Figure 1:
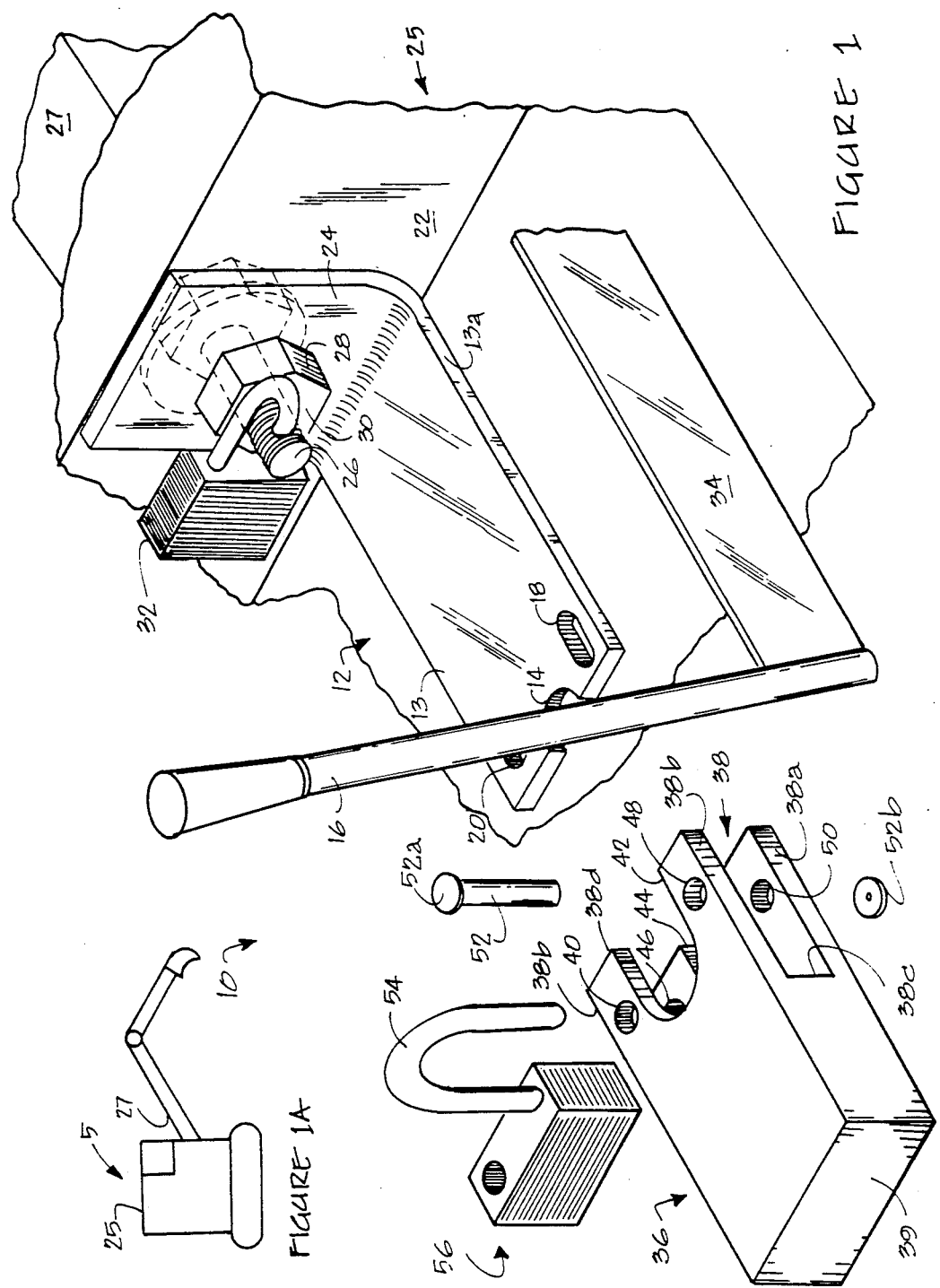
FIG. 1 is a partly cut-away, exploded, perspective of the apparatus of the present invention.
Figure 2:
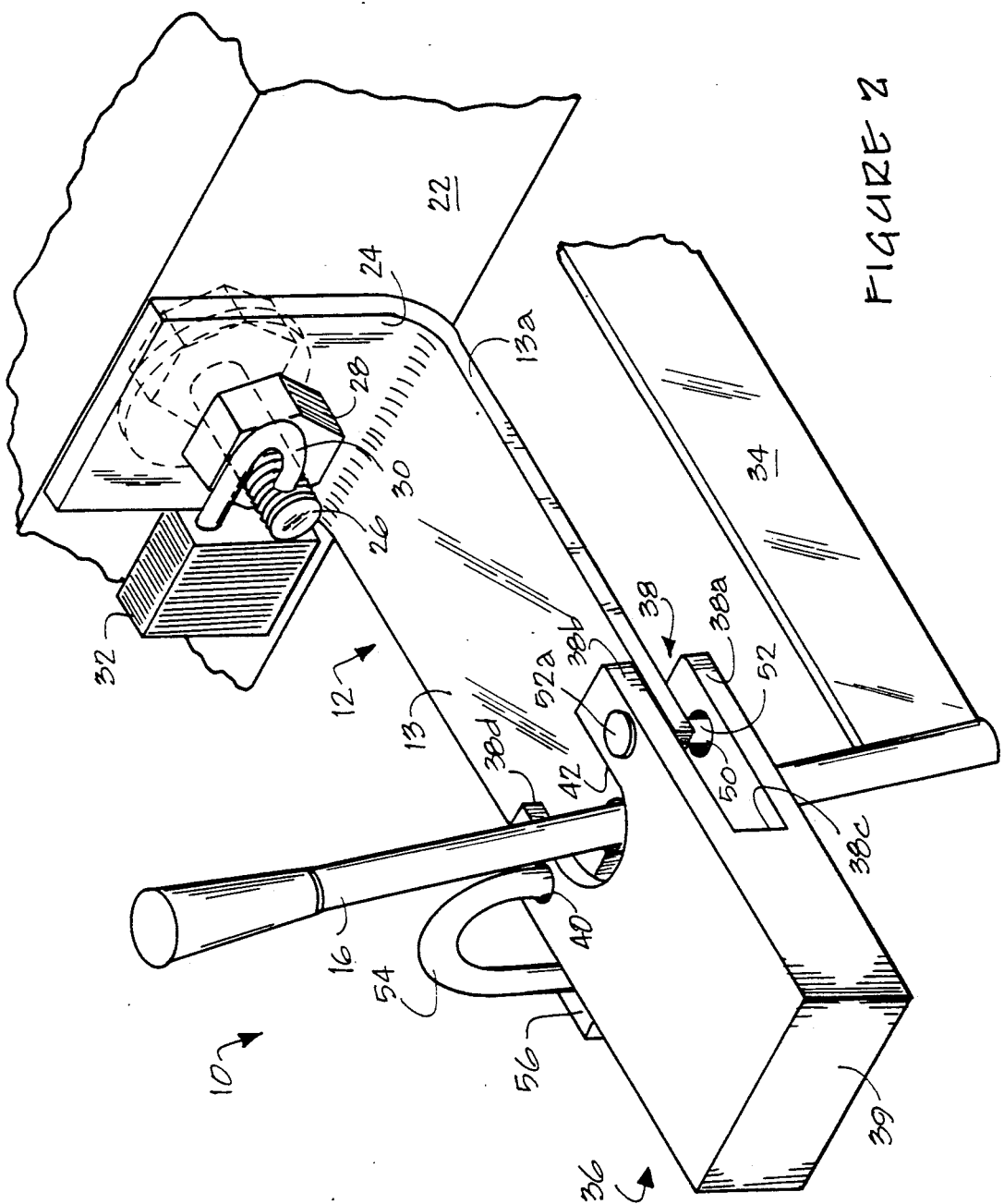
FIG. 2 is a partly cut-away, perspective of the apparatus of the present invention.
Figure 3:
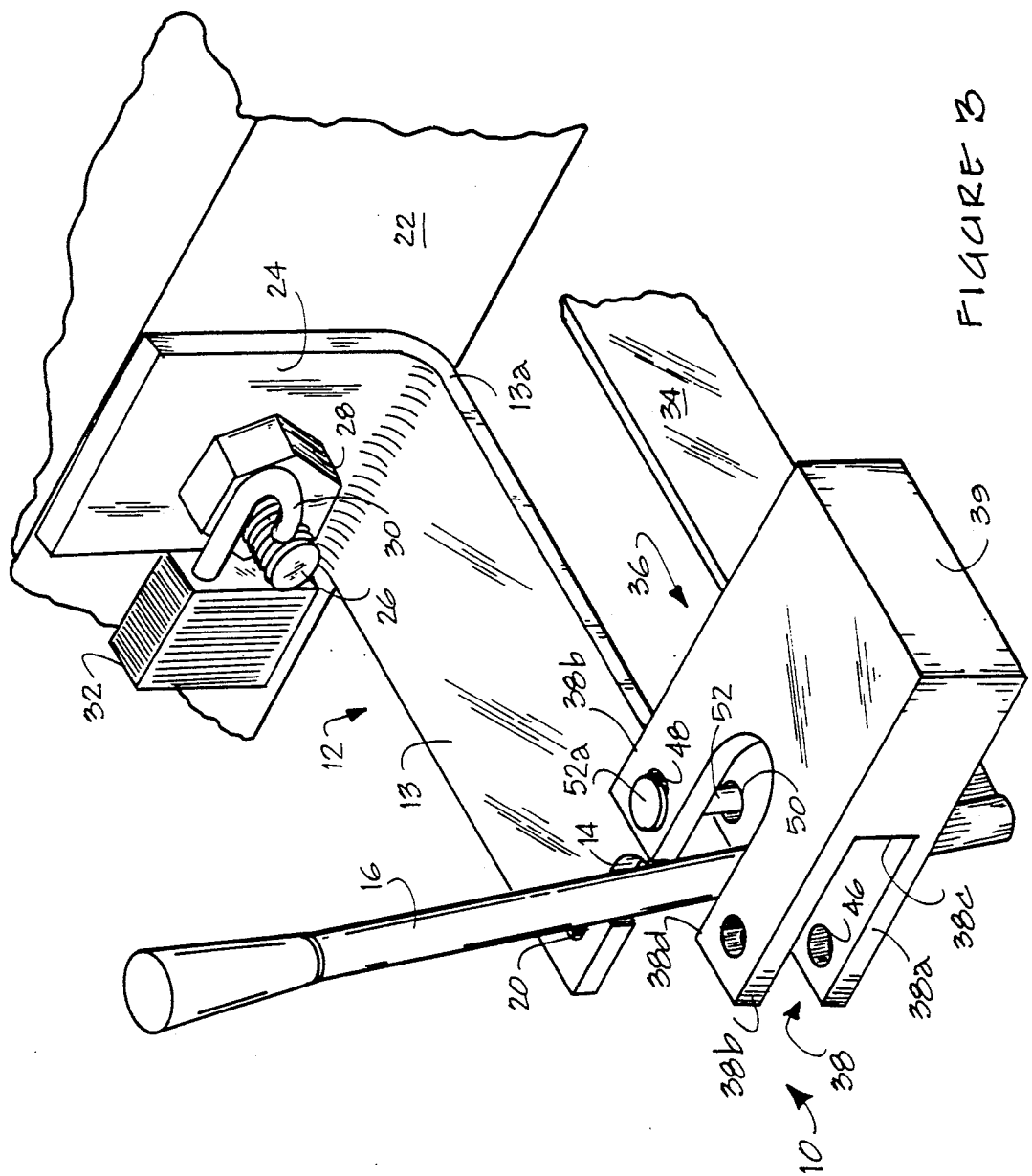
FIG. 3 is a partly cut-away, perspective of the apparatus of the present invention positioned to receive a control stick.

Referring now to the drawings, in FIGS. 1-3 is shown the control stick locking apparatus of the invention generally indicated by the numeral 10. Crane boom control stick 16 is a conventional control stick found on cranes such as those commonly referred to as "cherry pickers" and on other cranes or boom-equipped machines such as ditch digging equipment. In such conventional cranes, usually two or more control sticks 16 extend upward from the floor of the operator's cab and may be connected by bar 34 to other conventional mechanisms such as hydraulically operated cylinders to control the movement of a boom.

A conventional crane is generally indicated by the numeral 5 in FIG. 1a. Crane 5 has a cab 25 having a boom 27 connected thereto. Cab 25 has a floor 25a shown in FIG. 1 and a horizontal portion 23 connected to dashboard 25.

Control stick locking apparatus 10 includes a stick receiving member generally indicated by the numeral 12. Stick receiving member 12 includes a flat, generally rectangular portion 13 having a semi-circular slot 14 therein for receipt of a conventional crane boom control stick 16. Slot 14 is sized to snugly fit control stick 16 to prevent movement of control stick 16 therein. Located generally adjacent to slot 14 is elongated slot 18 and circular slot 20.

Stick receiving member 12 is connected to the dashboard 22 shown in FIGS. 1-3 of the cab of a conventional crane by plate 24 which is connected perpendicularly to stick receiving member 12 and is preferably integrally formed therewith from a continuous piece of metal. Plate 24 could be eliminated if desired, and the end 13a of rectangular portion 13 of stick receiving member 12 could be connected to dashboard 22 by any other conventional fastening method, or rectangular portion 13 could be formed integrally with dashboard 22. Furthermore, if desired, stick receiving member 12 could be connected to any other stationary structure in the cab which would allow connection of control stick 16 to stick receiving member 12.

Stick receiving member 12 also has a plate 24 which is connected to dashboard 22 by bolt 26 and nut 28. Preferably bolt 26 has a hole therein for receipt of the U-shaped bar 30 of padlock 32. Padlock 32 enables safety personnel to lock stick receiving member 12 and plate 24 to dashboard 22 and keep the key (not shown) to padlock 32, thereby preventing the operator from removing stick receiving member 12.

A locking member generally indicated by the numeral 36 is used to hold control stick 16 in a stationary position. Locking member 36 has a generally rectangular channel therein generally indicated by the numeral 38 for receipt of rectangular portion 13 of stick receiving member 12. U-shaped channel 38 has two parallel side walls 38a and 38b connected to a generally rectangular base 39, and a bottom wall 38c which is perpendicular to side walls 38a and 38b.

Locking member 36 has two parallel U-shaped slots 42 and 44 for receipt of control stick 16. Located adjacent to U-shaped slots 42 and 44 are circular slots 40 and 46 in sidewalls 38b and 38a, respectively, which are aligned about a common centerline. Also located adjacent to U-shaped slots 42 and 44 are circular slots 48 and 50 in sidewalls 38b and 38a, respectively, which are aligned about a common centerline. U-shaped slots 42 and 44 are sized so that the bottom 42a of slot 42 and the bottom (not shown) of slot 44 contact control stick 16 to hold control stick 16 to prevent movement of control stick 16 in semi-circular slot 14.

As shown in FIGS. 2 and 3, locking member 36 is connected stick receiving member 12 by pin 52 having head 52a and tail 52b which is received in circular slot 48, elongated slot 18, and circular slot 50. Pin 52 is preferred so that the operator cannot remove locking member 36 from stick receiving member 12.

As can be seen in FIG. 3, locking member 36 swings or pivots about pin 52. Elongated slot 18 permits locking member 36 to move the length of elongated slot 18 to close around control stick 16. Elongated slot 18 and prevents the end 38d of side wall 38b from striking control stick 16 when locking member 36 is pivoted about non-removable pin 52 to close locking member 36 about control stick 16. As shown in FIG. 2, U-shaped bar 54 of padlock generally indicated by the numeral 56 may then be inserted into circular slot 40, circular slot 20, and circular slot 46 to securely lock control stick 16 in a stationary position.

The present invention permits safety personnel to limit the movement of a crane boom quickly and easily, and thereby prevent injury to personnel caused by the boom striking an electric power line or other undesirable object. Prior to the operator entering the cab of the crane, safety personnel can open the control stick locking apparatus 10 to the position shown in FIG. 3, move the control stick 16 to the desired position, insert padlock 56 in the position indicated in FIG. 2 and lock padlock 56, and remove the key (not shown). The operator is then unable to move the control stick 16, and movement of the boom of the crane is limited as desired by the safety personnel.

Multiple control stick locking apparatus 10 may be used as desired. Furthermore, multiple control stick locking devices having rectangular portions 13 of several different lengths. Safety personnel can quickly remove padlock 32 from bolt 26, and install another control stick locking apparatus having a rectangular portion 13 of the desired length.

Although the preferred embodiments of the present invention have been disclosed and described in detail above, it should be understood that the invention is in no sense limited thereby, and its scope is to be determined by that of the following claims:

What is claimed is:

1. A method for limiting movement of a crane boom of a crane having a cab from which an operator of the crane controls the crane boom, the cab having at least one elongated control stick for controlling movement of the crane boom, the method comprising:
   a. moving the control stick of a crane having a dash board in the cab of said crane which extends generally upward from a bottom portion of the cab of the crane to a desired position,
   b. connecting control stick receiving member means for receiving and holding said control stick to the dash board of said cab,
   c. connecting locking member means for locking said control stick to said stick receiving member means, and
   d. locking said locking member means to said stick receiving means to prevent movement of said control stick.

2. The method of claim 1 wherein said locking comprises connecting a padlock to said locking member means.

* * * * *